(12) United States Patent
Sharma et al.

(10) Patent No.: US 12,356,992 B2
(45) Date of Patent: Jul. 15, 2025

(54) 1-AMINO-1-CYCLOPROPANECARBOXYLIC ACID SOLID COMPOSITIONS

(71) Applicant: Valent BioSciences LLC, Libertyville, IL (US)

(72) Inventors: Parvesh Sharma, Buffalo Grove, IL (US); Yueqian Zhen, Gurnee, IL (US); Benjamin A. Belkind, Wilmette, IL (US); Zhengyu Huang, Buffalo Grove, IL (US); Steve McArtney, Antioch, IL (US); Peter D. Petracek, Grayslake, IL (US); Mitsuhiro Sasakawa, Tokyo (JP)

(73) Assignee: VALENT BIOSCIENCES LLC, Libertyville, IL (US)

( * ) Notice: Subject to any disclaimer, the term of this patent is extended or adjusted under 35 U.S.C. 154(b) by 41 days.

(21) Appl. No.: 17/589,964

(22) Filed: Feb. 1, 2022

(65) Prior Publication Data
US 2022/0240512 A1 Aug. 4, 2022

Related U.S. Application Data

(60) Provisional application No. 63/144,343, filed on Feb. 1, 2021.

(51) Int. Cl.
*A01N 53/00* (2006.01)
*A01N 25/08* (2006.01)
*A01N 25/10* (2006.01)
*A01N 25/14* (2006.01)
*A01P 21/00* (2006.01)

(52) U.S. Cl.
CPC ............ *A01N 53/00* (2013.01); *A01N 25/08* (2013.01); *A01N 25/10* (2013.01); *A01N 25/14* (2013.01); *A01P 21/00* (2021.08)

(58) Field of Classification Search
CPC ..................................................... A01N 53/00
See application file for complete search history.

(56) References Cited

U.S. PATENT DOCUMENTS

| | | | | |
|---|---|---|---|---|
| 6,984,609 | B2* | 1/2006 | Devisetty | C08K 5/04 524/17 |
| 2006/0003898 | A1 | 1/2006 | Devisetty et al. | |
| 2010/0216641 | A1* | 8/2010 | Wang | A01N 43/90 504/210 |
| 2013/0316901 | A1* | 11/2013 | Meissner | A01N 33/12 504/345 |
| 2017/0325457 | A1* | 11/2017 | Heidebrecht, Jr. | C07C 271/34 |
| 2018/0279622 | A1* | 10/2018 | Sharma | A01N 25/22 |
| 2020/0236926 | A1 | 7/2020 | Lopez et al. | |
| 2020/0323214 | A1 | 10/2020 | Sasakawa et al. | |

OTHER PUBLICATIONS

Safety Data Sheet for Silwet L-77 (Year: 2023).*
Brady et al. (Developing Solid Oral Dosage Forms (Second Edition), Pharmaceutical Theory and Practice, 2017) (Year: 2017).*
https://www.gardeningknowhow.com/ornamental/shrubs/shgen/woody-perennial-information.htm (Year: 2023).*
International Search Report and Written Opinion for corresponding PCT Application No. PCT/US2022/014649 mailed Feb. 1, 2022.

* cited by examiner

Primary Examiner — Andrew S Rosenthal
Assistant Examiner — Danielle Kim
(74) Attorney, Agent, or Firm — Wood, Phillips, Katz, Clark & Mortimer

(57) ABSTRACT

The present invention is directed to a water-soluble granule compositions comprising 1-amino-1-cyclopropanecarboxylic acid ("ACC"), a filler selected from the group consisting of lactose, dextrose, sucrose or a mixture thereof, one or more wetting agents selected from the group consisting of a non-ionic ethoxylated sorbitan, a polyoxyethylene glycol alkyl ether and an anionic dioctyl sulfosuccinate, one or more binders selected from the group consisting of polyvinylpyrrolidone and a lignosulfonate and one or more organosilicon surfactants selected from the group consisting of a polyalkyleneoxide modified heptamethyltrisiloxane and a polyether trisiloxane.

4 Claims, 1 Drawing Sheet
(1 of 1 Drawing Sheet(s) Filed in Color)

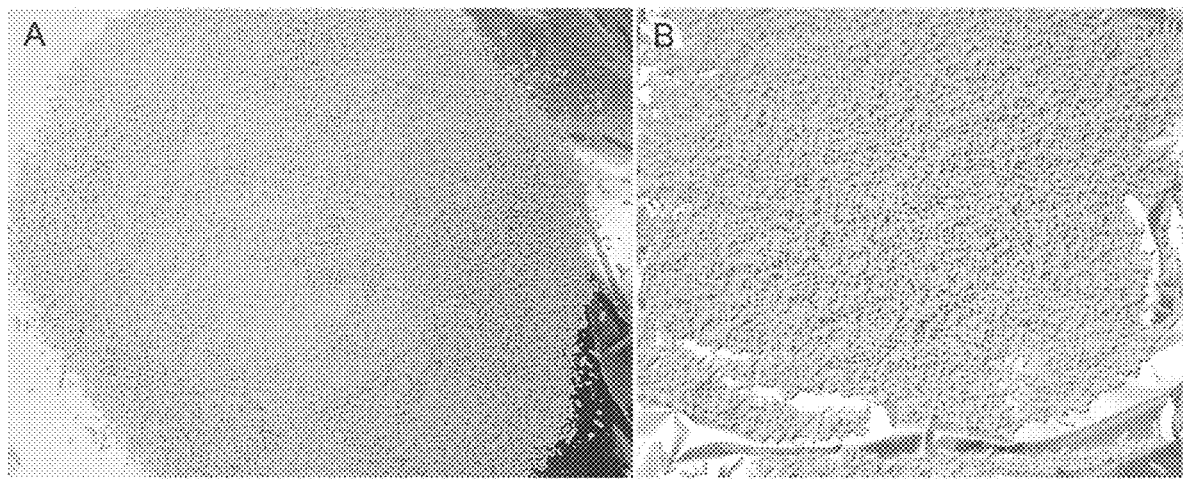

1-AMINO-1-CYCLOPROPANECARBOXYLIC ACID SOLID COMPOSITIONS

FIELD OF THE INVENTION

The present invention relates to stable water-soluble granule compositions comprising 1-amino-1-cyclopropanecarboxylic acid ("ACC"), a filler selected from the group consisting of lactose, dextrose, sucrose, maltodextrin, a sugar alcohol or a mixture thereof, one or more wetting agents selected from the group consisting of a non-ionic ethoxylated sorbitan, a polyoxyethylene glycol alkyl ether and an anionic dioctyl sulfosuccinate, one or more binders selected from the group consisting of polyvinylpyrrolidone and a lignosulfonate and one or more organosilicon surfactants selected from the group consisting of a polyalkyleneoxide modified heptamethyltrisiloxane and a polyether trisiloxane. The present invention is further directed to wettable powder compositions comprising ACC, a filler and a surfactant.

BACKGROUND OF THE INVENTION 1-amino-1-cyclopropanecarboxylic acid ("ACC") is synthesized by ACC synthase in plants and acts as a precursor for the biosynthesis of ethylene. Ethylene has been shown to be involved in several plant responses including stress, fruit set, leaf abscission and anthesis. Because of its role as an ethylene precursor ACC has been used in agriculture to induce ethylene responsive events.

Specifically, ACC has been demonstrated to thin pome fruits and stone fruits. See U.S. Pat. No. 8,435,929 ("the '929 patent") issued to Valent BioSciences LLC, Libertyville, IL. Reduction of the crop load on a tree (thinning) is often used to produce high quality tree fruit. During flowering and fruit set, growers commonly physically or chemically remove flowers (flower thinning) or young fruit (fruitlet thinning) to maximize the size and quality of the remaining fruit (Dennis, 2000, Plant Growth Reg. 31: 1-16). In the '929 patent Valent BioSciences LLC demonstrated that ACC provided more consistent thinning than ethephon.

Further, ACC has been demonstrated to provide enhancement of grape coloration. See U.S. Pat. No. 10,694,748 issued to Valent BioSciences LLC, Libertyville, IL. Fruit color is an important quality factor in red table and Wine grapes. Commercial harvest requires sufficient levels of color in commercially mature fruit and this can be significant challenge for table grape growers. Fruit color development can be influenced by a number of factors including the grape cultivar, rootstock, plant vigor, climate, canopy management, light exposure, crop load, irrigation, fertilization, and plant growth regulators. Consequently, achieving optimal fruit color requires a programmatic approach rather than the use of a single tool or practice. In the '748 patent Valent demonstrated that a combination of S-abscisic acid ("S-ABA") and ACC improved marketable grape coloration over S-ABA alone.

ACC has been formulated in ready-to-use sprays and concentrated liquids. See, United States Patent Application Publication Number 2018-0279621 A1 (published Oct. 4, 2018) and U.S. Pat. No. 10,517,299 B2 (published Dec. 31, 2019). While liquid formulations have many storage and application benefits, certain applications require solid formulations. Further, solid formulations have their own handling, transport, and storage benefits.

Water-soluble granules and wettable powders are two types of solid formulations that are preferred by farmers due to their storage stability and ease of dissolving prior to application. Water-soluble granules are a preferred formulation for particular application types. However, ACC has not been formulated as a water-soluble granule or a wettable powder. Thus, there is a need in the art for a stable ACC water-soluble granule formulation and a wettable powder formulation.

SUMMARY OF THE INVENTION

The present invention is directed to a water-soluble granule compositions comprising 1-amino-1-cyclopropanecarboxylic acid ("ACC"), a filler selected from the group consisting of lactose, dextrose, sucrose or a mixture thereof, one or more wetting agents selected from the group consisting of a non-ionic ethoxylated sorbitan, a polyoxyethylene glycol alkyl ether and an anionic dioctyl sulfosuccinate, one or more binders selected from the group consisting of polyvinylpyrrolidone and a lignosulfonate and one or more organosilicon surfactants selected from the group consisting of polyalkyleneoxide modified heptamethyltrisiloxane and a polyether trisiloxane.

The present invention is further directed to a wettable powder comprising ACC, a filler and a surfactant.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1. Extrudate formation upon extrusion of ACC wet mass, panel A 40% ACC and 21% water and panel B 40% ACC and 27% water.

DETAILED DESCRIPTION OF THE INVENTION

In one embodiment, the present invention is directed to a water-soluble granule compositions comprising 1-amino-1-cyclopropanecarboxylic acid ("ACC"), a filler selected from the group consisting of lactose, dextrose, sucrose, maltodextrin, a sugar alcohol or a mixture thereof, one or more wetting agents selected from the group consisting of a non-ionic ethoxylated sorbitan, a polyoxyethylene glycol alkyl ether and an anionic dioctyl sulfosuccinate, one or more binders selected from the group consisting of polyvinylpyrrolidone and a lignosulfonate and one or more organosilicon surfactants selected from the group consisting of a polyalkyleneoxide modified heptamethyltrisiloxane and a polyether trisiloxane.

ACC may be present in compositions of the present invention at a concentration from about 5% to about 90% w/w, preferably from about 10% to about 70% w/w, even more preferably from about 20% to about 60% w/w and most preferably at about 40% w/w.

In another preferred embodiment, a filler selected from the group consisting of lactose, dextrose, sucrose, maltodextrin, a sugar alcohol or a mixture thereof may be present in compositions of the present invention at a concentration from about 1% to about 89% w/w, more preferably from about 30% to about 80% w/w even more preferably from about 37% to about 77% w/w and most preferably at about 37.7%, about 47.7%, about 52.7%, about 55.9%, about 56.4%, about 66.3% or about 76.3% w/w.

In a preferred embodiment, lactose may be present in compositions of the present invention as lactose monohydrate.

Wetting agents suitable for use in the present invention include, but are not limited to, non-ionic surfactants, such as ethoxylated sorbitans including the polysorbates in the Tween® series such as Tween® 20-24, 40, 60, 80 and the like (Tween is a registered trademark of and available from Croda Americas LLC), polyoxyethylene glycol alkyl ethers including the Brij® series such as Brij® 35, 78, 98, 700, O20, C10, C2, C20, L4, L23, S20 and the like (Brij is a registered trademark of and available from Croda Americas LLC) and anionic surfactants such as, dioctyl sulfosuccinates including Aerosol® anionic surfactants such as 22, A-102, C-61, OT-75, OT-A, OT-B, and the like (Aerosol is a registered trademark of Cytec Technology Corp and available from Solvay). In a preferred embodiment the wetting agent is selected from the group consisting of polyoxyethylene vegetable-based fatty ether derived from cetyl alcohol (Brij® 020), polysorbate 20 (Tween® 20) and dioctyl sulfosuccinate sodium salt (Aerosol® OT-B).

In a preferred embodiment, the one or more wetting agents are present in compositions of the present invention at concentration from about 1% to about 10% w/w, more preferably from about 1.5% to about 3.5% w/w and most preferably at about 1.5%, about 2.5% or about 3.5% w/w.

Binders suitable for use in the present invention include, but are not limited to, polyvinylpyrrolidone and a lignosulfonate including calcium lignosulfonate and sodium lignosulfonate. In a preferred embodiment the binder is selected from the group consisting of polyvinylpyrrolidone and sodium lignosulfonate.

In a preferred embodiment, the one or more binders are present in compositions of the present invention at concentration from about 0.1% to about 10% w/w, more preferably from about 0.1% to about 5.0% w/w, even more preferably from about 0.5% to about 2.0% w/w and most preferably at about 0.8%, about 1.0%, about 1.1%, about 1.5% or about 2.0% w/w.

Organosilicon surfactants suitable for use in the present invention, include, but are not limited to polyalkyleneoxide modified heptamethyltrisiloxane (Silwet ECO spreader; Silwet is a registered trademarks of and available from Momentive Performance Chemicals) and a polyether trisiloxane including Break-Thru® S series polyether trisiloxanes such as S 200, S 233, S 240, S 279 and S 301.

In a preferred embodiment, the one or more organosilicon surfactants are present in compositions of the present invention at concentration from about 0.01% to about 1% w/w, more preferably from about 0.05% to about 0.2% w/w and most preferably at about 0.1% w/w.

In a preferred embodiment, compositions of the present invention further comprise water. Water may be present in compositions of the present invention at a concentration from about 0.1% to about 10% w/w, more preferably from about 0.5% to about 5% w/w, even more preferably from about 0.5% to about 4% w/w and most preferably at about 0.5, 1, 1.5, 2, 2.5, 3.0 or 3.5% w/w. The moisture determination in the compositions of the present invention is done by loss on drying method.

In another preferred embodiment, compositions of the present invention may further comprise pH adjustors. pH adjustors suitable for use in the present invention include, but are not limited to, citric acid, malic acid and the like. pH adjustors may be present in compositions of the present invention at a concentration necessary to adjust the pH to a value from about 4 to about 6 and more preferably from about 4 to about 5.

In another preferred embodiment, compositions of the present invention may further comprise calcium chloride. Calcium chloride may be present in compositions of the present invention at a concentration from about 1% to about 50% w/w, more preferably from about 2% to about 30% w/w, even more preferably from about 5% to about 20% w/w and most preferably at about 5%, about 10% or about 20% w/w.

In another embodiment, the present invention is directed to a wettable powder comprising ACC, a filler and a surfactant.

Fillers suitable for use in the wettable powder formulations of the present invention include, but are not limited to, lactose, dextrose, sucrose, maltodextrin, a sugar alcohol and hydrates thereof. Sugar alcohols include, but are not limited to, sorbitol and mannitol.

Surfactants suitable for use in wettable powder compositions of the present invention include, but are not limited to, dioctyl sulfosuccinate sodium salt and lignosulfonate including calcium lignosulfonate and sodium lignosulfonate.

In a preferred embodiment, wettable powder compositions of the present invention further comprise a free flow agent.

Free flow agents suitable for use in the present invention include, but are not limited to, silicon dioxide and precipitated sodium alumino silicate.

Excipients suitable for use in granule compositions of the present invention may be suitable for use in wettable powder compositions of the present invention and vice versa.

Additional excipients that may be added to compositions of the present invention include, but are not limited to, stickers, wetting agents, systemic acquired resistance inducers, dyes, humectants, UV protectants and combinations thereof.

In another embodiment, the present invention is directed to a method of reducing crop load in woody perennials comprising applying a composition of the present invention to a plant, preferably the woody perennial is a stone fruit tree or an apple tree and more preferably a nectarine tree, a peach tree or a plum tree.

Stone fruit trees, include but are not limited to, peach trees, nectarine trees, plum trees, apricot trees, and cherry trees.

In another embodiment, the present invention is further directed to a method of enhancing grape coloration comprising applying a formulation of the present invention to a grape plant.

Throughout the application, the singular forms "a," "an," and "the" include plural reference unless the context clearly dictates otherwise.

As used herein, all numerical values relating to amounts, weight percentages and the like that are defined as "about" or "approximately" each particular value denotes plus or minus 10% of that particular value. For example, the phrase "about 10% w/w" is to be understood as encompassing values from 9% to 11% w/w. Therefore, amounts within 10% of the claimed values are encompassed by the scope of the invention.

The invention is demonstrated by the following representative examples. These examples are offered by way of illustration only and not by way of limitation.

EXAMPLES

Agrimer® 30 was used as the source of polyvinylpyrrolidone (Agrimer is a registered trademark of and available from Pharmachem Laboratories LLC and Ashland).

Ultrazine NA or Greensperse S9 was used as the source of sodium lignosulfonate and each are available from Borregaard Lignotech.

Example 1-Process for Preparing an ACC Water-Soluble Granule

Method

Binder solution is sprayed onto a composition containing ACC active ingredient and lactose dry powder to form a wet mass in an open-air system under laboratory conditions. The wet mass is fed into an extruder. The extruder forces the wet mass through a die forming an extrudate. The extrudate is then dried 24 hours at 40 degrees Celsius resulting in an ACC water-soluble granule.

Results

As seen in FIG. 1 panel A, the addition of 21% water (weight by total weight of the wet mass) to an amount of ACC dry powder sufficient to provide about 40% ACC (weight by total weight of the ACC water-soluble granule) resulted in a low moisture extrudate that, when dried, formed undesirably brittle granules. Surprisingly, the addition of water at a concentration from 22 to 28.5% (weight by total weight of the wet mass) to an amount of ACC dry powder sufficient to provide about 40% ACC (weight by total weight of the ACC water-soluble granule) resulted in well-formed, resilient extrudates and granules after drying. See FIG. 1 panel B. The drying of these well-formed extrudate yielded well-formed granules with a moisture content of about 3% w/w as measured by the loss on drying method. Loss on drying method can be performed on common instruments such as the CEM Smart 5, OHAUS or Mettler Toledo moisture analyzers.

Further experiments in a system closed to outside air ("closed-air system") demonstrated that the addition of binder solution containing 20% water (weight by total weight of the wet mass) to an amount of ACC and inert filler dry powder mixture sufficient to provide about 40% ACC (weight by total weight of the ACC water-soluble granule) resulted in well-formed, resilient extrudates and granules after drying. Not to be held to a particular theory, the Applicant believes that the open-air system led to additional water loss during the preparation of the granule as compared to the closed-air system such that a smaller amount of water can be used in a closed-air system as compared to an open-air system to achieve similar well-formed granules.

Example 2-Stability of ACC Water-Soluble Granules of the Present Invention

TABLE 1

| Composition | #1 | #2 | #3 |
|---|---|---|---|
| ACC free acid | 20% | 30% | 40% |
| Lactose monohydrate | Q.S. | Q.S. | Q.S. |
| Polyalkyleneoxide modified heptamethyltrisiloxane | 0.1% | 0.1% | 0.1% |
| Polysorbate 20 | 2.5% | 2.5% | 2.5% |
| Polyvinylpyrrolidone | 1.1% | 1.1% | 1.0% |

% based on weight by total weight of the composition

Method

ACC water-soluble granules having the compositions in Table 1, above, were prepared by the process of Example 1. Well-formed granules were prepared for each. The 40% ACC granules were further tested for ACC concentration, attrition and solubility before and after being subject to temperatures of either 5 or 54 degrees Celsius for 2 weeks. Attrition is defined as the wearing away of the surface of a granule by friction or impact. Attrition was tested under similar or more stringent standards than those provided by the International Pesticides Analytical Council (CIPAC) under code MT 178.2. Results can be seen in Table 2, below.

TABLE 2

|  | T = 0 | 5° C. for 2 Weeks | 54° C. for 2 Weeks |
|---|---|---|---|
| Assay (% ACC) | 39.5 | 39.4 | 39.4 |
| Attrition | <1.0% | <1.0% | <1.0% |
| No. of Inversion to Dissolve in Water | <15 | <15 | <15 |

Results

As seen in Table 2, ACC water-soluble granules of the present invention are physically stable under accelerated storage conditions.

Example 3-Stability of ACC Water-Soluble Granules of the Present Invention

Method

The 40% ACC water-soluble granule of Example 2, above, was tested for ACC concentration before and after being subject to temperatures of either 5, 25, 30 or 40 degrees Celsius for up to 2 years. ACC concentration was determined at time 0 and 3, 12, 18 and 24 months. Results can be seen in Table 3, below.

TABLE 3

| Temperature (° C.) | Time 0 | 3 Months | 12 Months | 18 Months | 24 Months |
|---|---|---|---|---|---|
| 5 | 39.4 | 39.3 | 39.8 | — | — |
| 25 | 39.4 | 39.4 | 39.8 | 39.8 | 39.1 |
| 30 | 39.4 | 39.2 | 39.8 | 39.5 | 39.5 |
| 40 | 39.4 | 39.6 | 39.8 | 39.6 | 39.7 |

Results

As seen in Table 3, ACC water-soluble granules of the present invention are chemically stable under accelerated and extended storage conditions.

Example 4-Stability of ACC Water-Soluble Granules with Sodium Lignosulfonate The 40% ACC water-soluble granule of Example 2, above, was formulated with 1.5% or 2.0% w/w sodium lignosulfonate in place of the 1.0% w/w polyvinylpyrrolidone. ACC water-soluble granules formulated with 1.5% or 2.0% w/w sodium lignosulfonate were well formed. Thus, the use of either polyvinylpyrrolidone or sodium lignosulfonate in compositions of the present invention result in stable ACC water-soluble granules.

Example 5-Stability of ACC Water-Soluble Granules with Various Wetting Agents and Organosilicon Surfactants

TABLE 4

| Composition | #3 | #4 | #5 | #6 |
|---|---|---|---|---|
| ACC free acid | 40% | 40% | 40% | 40% |
| Lactose monohydrate | Q.S. | Q.S. | Q.S. | Q.S. |
| Polyalkyleneoxide modified heptamethyltrisiloxane | 0.1% | 0.1% | — | 0.1% |
| Polyether trisiloxane | — | — | 0.1% | — |
| Polysorbate 20 | 2.5% | — | 2.0% | — |
| Polyvinylpyrrolidone | 1.0% | 1.0% | 1.0% | 1.0% |
| Polyoxyethylene vegetable-based fatty ether derived from cetyl alcohol | — | 2.5% | — | — |
| Sodium Lignosulfonate | — | — | 1.0% | — |
| Dioctyl sulfosuccinate sodium salt | — | — | — | 2.5% |

% based on weight by total weight of the composition

The 40% ACC water-soluble granule of Example 2, above, was formulated with various wetting agents and organosilicon surfactants as shown in Table 4, above. ACC water-soluble granules formulated with polyoxyethylene vegetable-based fatty ether derived from cetyl alcohol or dioctyl sulfosuccinate sodium salt as the wetting agent were well formed. Further, ACC water-soluble granules formulated with polyether trisiloxane were well formed. Thus, the use of either polyoxyethylene vegetable-based fatty ether derived from cetyl alcohol or dioctyl sulfosuccinate sodium salt as the wetting agent and/or polyether trisiloxane as the organosilicon surfactant in compositions of the present invention result in stable ACC water-soluble granules.

Example 6 Composition of ACC Water-Soluble Granules with Calcium Chloride

TABLE 5

| Composition | #7 | #8 | #9 | #10 |
|---|---|---|---|---|
| ACC free acid | 40% | 40% | 40% | 40% |
| Lactose monohydrate | Q.S. | Q.S. | Q.S. | Q.S. |
| Polyvinylpyrrolidone | 0.8% | 0.8% | 0.8% | 0.8% |
| Polysorbate 20 | 1.5% | 1.5% | 1.5% | 1.5% |
| Calcium chloride | — | 5% | 10% | 20% |

% based on weight by total weight of the composition

The 40% ACC water-soluble granule of in Table 5, above, was formulated using the process of Example 1, above. All compositions resulted in well-formed granules. Thus, the inclusion of calcium chloride results in stable ACC water-soluble granules.

Example 7 pH of Compositions of the Present Invention

ACC activity has previously been demonstrated to be dependent on the pH of the solution at application. The desirable pH for ACC application is around 4. In order to reduce the pH, organic acids have been added to the formulation composition. Table 6 demonstrates compositions of the present invention with citric acid added between 0.25 to 1.75% w/w. The pH of the solution measured at 600 ppm in WHO water was determined to be in 4-5 range. It was determined that the pH of the application solution could be decreased to 4 with about 1% citric acid.

TABLE 6

| Composition | #11 | #12 | #13 | #14 |
|---|---|---|---|---|
| ACC free acid | 40.0% | 40.0% | 40.0% | 40.0% |
| Lactose monohydrate | Balance | Balance | Balance | Balance |
| Polyether trisiloxane | 0.1% | 0.1% | 0.1% | 0.25% |
| Polysorbate 20 | 2.5% | 2.5% | 2.5% | 2.5% |
| Polyvinylpyrrolidone | 1.0% | 1.0% | 1.0% | 1.0% |
| Dioctyl sodium sulfosuccinate | 1.0% | — | — | — |
| Citric acid | 1.75% | 1.0% | 0.5% | 0.25% |

% based on weight by total weight of the composition

What is claimed is:

1. A stable water-soluble granule composition consisting of:
   from about 20% to about 40% w/w 1-amino-1-cyclopropanecarboxylic acid;
   from about 37% to about 77% w/w lactose monohydrate;
   from about 1.5% to about 3.5% w/w of one or more wetting agents are selected from the group consisting of polyoxyethylene vegetable-based fatty ether derived from cetyl alcohol, polysorbate 20 and dioctyl sulfosuccinate sodium salt;
   from about 0.5% to about 2.0% w/w of one or more binders selected from the group consisting of polyvinylpyrrolidone and sodium lignosulfonate;
   from about 0.05% to about 0.2% w/w one or more organosilicon surfactants selected from the group consisting of a polyalkyleneoxide modified heptamethyltrisiloxane and a polyether trisiloxane;
   from about 2% to about 4% w/w water; and
   optionally, from about 5% to about 20% w/w calcium chloride, wherein the composition has a pH from about 4 to about 6 and wherein w/w denotes weight by total weight of the composition.

2. A method of reducing crop load of woody perennials comprising applying a composition of claim 1 to a plant.

3. The method of claim 2, wherein the plant is a stone fruit tree or an apple tree.

4. A method of enhancing grape coloration comprising applying a composition of claim 1 to a grape plant.

* * * * *